United States Patent Office 3,455,936
Patented July 15, 1969

3,455,936
SUBSTITUTED INDOLO[2,3-a]QUINOLIZINIUM SALTS
Bryce Douglas, Phoenixville, Pa., and Jerry A. Weisbach, Cherry Hill, N.J., assignors to Smith Kline & French Laboratories, Philadelphia, Pa., a corporation of Pennsylvania
No Drawing. Filed Apr. 18, 1967, Ser. No. 631,574
Int. Cl. C07d 57/06
U.S. Cl. 260—294.3                                    9 Claims

ABSTRACT OF THE DISCLOSURE

Substituted indolo[2,3-a]quinolizinium salts, which are prepared by reacting a substituted 3-(2-aminoethyl)indole, formaldehyde and an oxo-triester and dehydrating the resulting lactam, have analgesic, antitussive and antidiarrheal activity. Substituted indolo[2,3-a]quinolizines are useful as intermediates for preparing quinolizinium salts.

This invention relates to new substituted indolo[2,3-a]quinolizinium salts having pharmacodynamic activity, in particular, analgesic, antitussive and antidiarrheal activity. In addition, this invention relates to new substituted indolo[2,3-a]quinolizines which are useful as intermediates for preparing quinolizinum salts of this invention, in particular they are useful as intermediates for separating the diastereoisomers of the quinolizinium salts.

The substituted indolo[2,3-a]quinolizinium salts of this invention are represented by the following structural formula:

Formula I

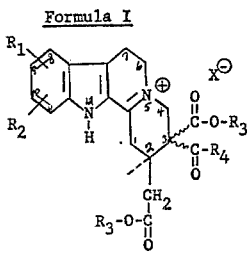

in which:
$R_1$ is lower alkyl, lower alkoxy and $R_2$ is hydrogen or $R_1$ and $R_2$, taken together, are di-lower alkyl, di-lower alkoxy or methylenedioxy;
$R_3$ is methyl or ethyl;
$R_4$ is lower alkyl; and
X is a pharmaceutically acceptable anion.

Preferred compounds of Formula I are those in which $R_1$ is methoxy, $R_2$ is hydrogen or methoxy and $R_3$ and $R_4$ are methyl. X is preferably perchlorate, chloride, sulfate or nitrate.

The indolo[2,3-a]quinolizines of this invention are represented by the following formula:

Formula II

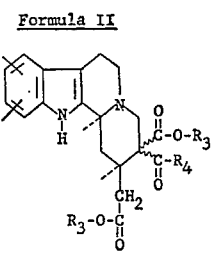

in which:
$R_1$ is lower alkyl, lower alkoxy and $R_2$ is hydrogen or $R_1$ and $R_2$, taken together, are di-lower alkyl, di-lower alkoxy or methylenedioxy;
$R_3$ is methyl or ethyl; and
$R_4$ is lower alkyl.

In the above formulas and in the formulas presented hereinbelow the bonds by which the substituents in the 3-position are attached to the ring are indicated as ⌇ because the stereochemical configuration of these substituents in not known at present. Separated isomers as well as mixtures thereof are included within the meaning of these formulas.

The terms "lower alkyl" and "lower alkoxy" where used herein denote groups having 1 to 4 carbon atoms.

The substituted indolo[2,3-a]quinolizinium salts of this invention are prepared by the following procedure:

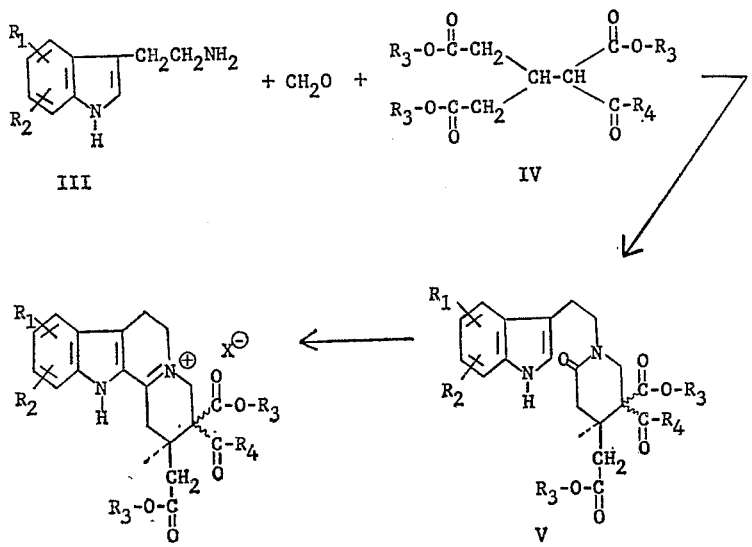

The terms $R_1$, $R_2$, $R_3$, $R_4$ and X are as defined above.

According to the above procedure, a substituted 3-(2-aminoethyl)indole (III), formaldehyde and an oxotriester (IV) in a lower alkanol such at t-butanol are condensed to give a lactam (V). The lactam is treated with a dehydrating agent such as phosphorus oxychloride, phosphorus pentoxide, phosphorus pentachloride or polyphosphoric acid to give the corresponding substituted indoloquinolizinium phosphate salt. Advantageously, the phosphate salts are hydrogenated in the presence of a catalyst such as platinum oxide in a solvent, for example a lower alkanol, to reduce the double bond at the 5,12b-position to give the indolo[2,3-a]quinolizine intermediates of Formula II and the quinolizines are oxidized with mercuric acetate in dilute acetic acid and treated with an alkali metal perchlorate to give the quinolizinium perchlorate salts of this invention. Alternatively, other salts are prepared from the phosphate salts by known methods for example by double decomposition with an appropriate salt. Salts may be converted to other salts by dissolving them in an appropriate solvent such as a lower alkanol, for example methanol, and passing the solution through an ion exchange resin.

The compounds of this invention may exist in diastereoisometric forms and it is intended that the separated isomers as well as the mixtures thereof are included within this invention. The isomers of the compounds of Formulas I and II (which are designated herein as isomers A and B) are separated by the following procedure. An indoloquinolizinium salt is hydrogenated by the procedure described hereabove to reduce the double bond at the 5,12b-position to give the indolo[2,3-a]quinolizines of the invention represented by Formula II above. The indolo[2,3-a]quinolizines obtained by hydrogenation of the indoloquinolizinium salts as described above, are obtained as mixtures of isomers. The mixture is reacted with lithium aluminum tri-t-butoxy hydride or sodium borohydride until, as shown by monitoring the reaction by thin layer chromatography, substantially all of the more polar isomer is reduced and the less polar isomer remains unreduced. The resulting materials are separated by a combination of fractional crystallization and chromatography on "Florisil" (magnesia-silica gel absorbent). The unreduced isomers, which is an isomer of an indolo[2,3-a]quinolizine of Formula II, is oxidized with mercuric acetate in dilute acetic acid to give isomer A of a compound of Formula I.

Isomer B of a compound of Formula I is prepared by recrystallizing the mixture of 5,12b-reduced isomers (a compound of Formula II), prepared as described above, and oxidizing the resulting isomer B of an indolo[2,3-a]quinolizine of Formula II with mercuric acetate in dilute acetic acid.

The compounds of this invention represented by Formula I above may be administered orally or parenterally in conventional dosage forms, such as tablets, capsules, injectables or the like, by incorporating an appropriate dose of the compound with pharmaceutical carriers according to accepted pharmaceutical practices.

The following examples are not limiting but are illustrative of this invention.

EXAMPLE 1

A mixture of 14.3 g. of 3-(2-aminoethyl)-5-methoxyindole, 20 g. of methyl 3-carbomethoxymethyl-4-carbomethoxy-5-oxohexanoate, 6.05 ml. of 37% aqueous formaldehyde solution, 2 ml. of N,N-dimethylaniline and 500 ml. of t-butanol is stirred for 24 hours at room temperature under nitrogen. Chloroform (250 ml.) is added and the solution is stirred for three days under nitrogen at room temperature, then refluxed for two hours and filtered. The t-butanol is evaporated off and the residue is partitioned between chloroform-10% aqueous hydrochloric acid. The chloroform extract is washed with saturated sodium chloride, dried over sodium sulfate and chromatographed on "Florisil" to give 5-acetyl-5-carbomethoxy - 4 - carbomethoxymethyl - 1 - [β-(5-methoxy-3-indolyl)ethyl]-2-piperidone.

Phosphorus oxychloride (50 ml.), 8.46 g. of the above prepared piperidone and 400 ml. of benzene are mixed. After stirring and refluxing under nitrogen for 2.5 hours, then cooling and washing with petroleum ether, 3-acetyl-3-carbomethoxy-2-carbomethoxymethyl-1,2,3,4,6,7 - hexahydro - 9-methoxy-12H-indolo[2,3 - a]quinolizinium dichlorophosphate is obtained.

3 - acetyl - 3 - carbomethoxy - 2 - carbomethoxymethyl - 1,2,3,4,6,7 - hexahydro - 9 - methoxy - 12H - indolo-[2,3-a]quinolizinium dichlorophosphate (3.0 g.) is hydrogenated in methanol solution with 0.75 g. of platinum oxide in a shaker apparatus for four hours. The mixture is filtered and concentrated and the residue is extracted with chloroform-dilute ammonia. The extract is washed with saturated sodium chloride, dried over sodium sulfate, then chromatographed on "Florisil" using chloroform as the eluent to give 3-acetyl-3-carbomethoxy-2-carbomethoxymethyl - 1,2,3,4,6,7,12,12 - octahydro - 9 - methoxyindolo[2,3-a]quinolizine.

A mixture of 0.6 g. of 3-acetyl-3-carbomethoxy-2-carbomethoxymethyl - 1,2,3,4,6,7,12,12b - octahydro - 9-methoxyindolo[2,3-a]quinolizine, 1.5 g. of mercuric acetate and 25 ml. of 5% acetic acid is heated on a steam bath under nitrogen for 75 minutes. The mixture is filtered and 5 g. of sodium perchlorate in water is added. The precipitate is filtered off and recrystallized from methanol-ethyl acetate to give 3-acetyl-3-carbomethoxy-2 - carbomethoxymethyl - 1,2,3,4,6,7 - hexahydro - 9-methoxy 12H-indolo[2,3-a]quinolizinium perchlorate.

The above prepared perchlorate salt in methanol is treated with potassium chloride in methanol. The mixture is concentrated and filtered. The filtrate is treated with ethyl acetate and filtered to give 3-acetyl-3-carbomethoxy - 2 - carbomethoxymethyl - 1,2,3,4,6,7 - hexahydro-9-methoxy-12H-indolo[2,3-a]quinolizinium chloride.

To 8.3 g. of 3-acetyl-3-carbomethoxy-2-carbomethoxymethyl - 1,2,3,4,6,7,12,12b - octahydro-9-methoxyindolo [2,3-a]quinolizine, prepared as described above, in 80 ml. of tetrahydrofuran (which has been redistilled over lithium aluminum hydride) is added a solution of 5.072 g. of lithium aluminum tri-t-butoxy hydride in 160 ml. of tetrahydrofuran dropwise with vigorous stirring over a period of one hour, under nitrogen, keeping the reaction mixture at −15 to −10° C. Thin layer chromatography using a silica plate and 10% ethyl acetate-90% chloroform as the developing system is used to monitor the course of the reaction. The reaction is stopped by adding water and then acetic acid when it appears that almost all of the more polar isomer is reduced and the less polar isomer, which has a higher Rf value, is unreduced. The tetrahydrofuran is removed in vacuo and the residue extracted with 10% sulfuric acid. The aqueous acid extracts are made alkaline with ammonium hydroxide and extracted with chloroform. The chloroform extract is washed with saturated sodium chloride and dried over sodium sulfate. The chloroform is evaporated off in vacuo and benzene is added to the residue. The mixture is filtered, the benzene is removed from the filtrate in vacuo and methanol is added to the residue. Cooling and filtering gives isomer A of 3-acetyl-3-carbomethoxy-2-carbomethoxymethyl - 1,2,3,4,6,7,12,12b - octahydro - 9-methoxyindolo[2,3-a]quinolizine. An additional amount of this material is obtained by removing the methanol from the filtrate in vacuo and chromatographing the residue.

The above prepared isomer A of 3-acetyl-3-carbomethoxy - 2 - carbomethoxymethyl - 1,2,3,4,6,7,12,12b-octahydro - 9-methoxyindolo[2,3-a]quinolizine is heated with mercuric acetate in 5% acetic acid on a steam bath under nitrogen for 1.5 hours to give, after filtering, adding sodium perchlorate in water, filtering and recrystallizing from methanol-ethyl acetate, isomer A of 3-acetyl-3-carbomethoxy-2-carbomethoxymethyl - 1,2,3,4,6,7 - hexahydro - 9-methoxy-12H-indolo[2,3-a]quinolizinium perchlorate.

A sample of the above prepared perchlorate salt in methanol is passed through a chloride ion exchange resin to give isomer A of 3-acetyl-3-carbomethoxy-2-carbomethoxymethyl-1,2,3,4,6,7-hexahydro-9-methoxy - 12H-indolo [2,3-a] quinolizinium chloride. Similarly, using a sulfate ion exchange resin, isomer A of 3-acetyl-3-carbomethoxy-2-carbomethoxymethyl - 1,2,3,4,6,7 - hexahydro-9-methoxy-12H-indolo [2,3-a]quinolizinium sulfate is obtained.

Five grams of the isomeric mixture of 3-acetyl-3-carbomethoxy - 2 - carbomethoxymethyl - 1,2,3,4,6,7,12,12b-octahydro-9-methoxyindolo[2,3-a]quinolizine is recrystallized four times from chloroform-methanol and once from benzene, then treated with methanolic hydrogen chloride to give, after concentrating in vacuo and recrystallizing the residue from methanol-ethyl acetate, isomer B of 3-acetyl-3-carbomethoxy-2-carbomethoxymethyl - 1,2,3,4,6,7,12,12b-octahydro - 9-methoxyindolo [2,3-a]quinolizine hydrochloride. Oxodizing the mercuric acetate in 5% acetic acid and treating with sodium perchlorate by the procedure described above gives isomer B of 3-acetyl-3-carbomethoxy-2-carbomethoxymethyl-1,2,3,4,6,7-hexahydro-9-methoxy - 12H - indolo[2,3-a]quinolizinium perchlorate.

EXAMPLE 2

By the procedure of Example 1 using the following indoles in place of 3-(2-aminoethyl)-5-methoxyindole;

3-(2-aminoethyl)-6-methoxyindole
3-(2-aminoethyl)-6-isopropoxyindole
3-(2-aminoethyl)-7-butoxyindole
3-(2-aminoethyl)-5,6-dimethoxyindole the following products are obtained, respectively:

3-acetyl-3-carbomethoxy-2-carbomethoxymethyl-1,2,3, 4,6,7-hexahydro - 10 - methoxy-12H-indolo[2,3-a]-quinolizinium perchlorate, 3-acetyl - 3 - carbomethoxy-2-carbomethoxymethyl-1, 2,3,4,6,7-hexahydro - 10 - isopropoxy -12H-indolo[2,3-a] quinolizinium perchlorate, 3-acetyl-11-butoxy-3-carbomethoxy - 2 - carbomethoxymethyl - 1,2,3,4,6,7 - hexahydro-12H-indolo[2,3-a]quinolizinium perchlorate, 3-acetyl-3-carbomethoxy - 2 - carbomethoxymethyl-1, 2,3,4,6,7-hexahydro-9,10-dimethoxy-12H - indolo[2,3-a] quinolizinium perchlorate.

EXAMPLE 3

By the procedure of Example 1 using the following indoles in place of 3-(2-aminoethyl)-5-methoxyindole:

3-(2-aminoethyl)-5-methlindole
3-(2-aminoethyl)-6-methylindole the following products are obtained, respectively:

3-acetyl-3-carbomethoxy-2-carbomethoxymethyl - 1,2, 3,4,6,7-hexahydro-9-methyl - 12H - indolo[2,3-a]quinolizinium perchlorate, 3-acetyl-3-carbomethoxy - 2 - carbomethoxymethyl-1, 2,3,4,6,7-hexahydro-10-methyl - 12H-indolo[2,3-a]quinolizinium perchlorate.

EXAMPLE 4

A mixture of 14.3 g. of 3-(2-aminoethyl)-5-methoxyindole, 6.05 ml. of 37% aqueous formaldehyde solution, 23 g. of ethyl 3-carboethoxymethyl-4-carboethoxy-5-oxohexanoate and 2 ml. of N,N-dimethylaniline in 500 ml. of t-butanol under nitrogen is stirred for five days, then refluxed for one hour. The t-butanol is evaporated off and the residue is extracted with chloroform-dilute sulfuric acid. The chloroform extract is washed with saturated aqeuous sodium chloride solution and dried over sodium sulfate. The extract is chromatographed on "Florisil" to give 5-acetyl-5-carboethoxy-4-carbethoxymethyl-1-[β-(5 - methoxy-3-indolyl)ethyl]-2-piperidone.

To 8.9 g. of the above prepared piperidone in 400 ml. of benzene is added 50 ml. of phosphorus oxychloride. The solution is refluxed under nitrogen for six hours. An equal volume of petroleum ether is added. The upper layer is decanted from the lower layer which is an oil. The oil is washed with petroleum ether and then dissolved in ethanol. The ethanol is removed in vacuo to give 3 - acetyl-3-carbethoxy-2-carbethoxymethyl - 1,2,3,4,6,7-hexahydro-9-methoxy-12H-indolo[2,3-a]quinolizinium dichlorophosphate.

The above prepared dichlorophosphate salt is dissolved in methanol. A saturated aqueous solution of sodium perchlorate is added to give, after filtering and recrystallizing from methanol-ethyl acetate, 3-acetyl-3-carbethoxy-2-carbethoxymethyl-1,2,3,4,6,7-hexahydro - 9 - methoxy-12H-indolo[2,3-a]quinolizinium perchlorate.

A sample of the above prepared perchlorate salt in methanol is passed through a nitrate ion exchange resin to give 3-acetyl-3-carbethoxy-2-carbethoxymethyl-1,2,3,4, 6,7 - hexahydro-9-methoxy-12H-indolo[2,3-a]quinolizinium nitrate.

Three grams of 3-acetyl-3-carbethoxy-2-carbethoxymethyl - 1,2,3,4,6,7 - hexahydro - 9 - methoxy-12H-indolo [2,3-a]-quinolizinium dichlorophosphate is dissolved in about 150 ml. of absolute ethanol. Platinum oxide (0.75 g.) is added and the mixture is hydrogenated in a shaker for four hours. The mixture is filtered, the ethanol is evaporated from the filtrate and the residue is extracted with chloroform-dilute ammonia. The chloroform extract is washed with saturated sodium chloride, dried over sodium sulfate and chromatographed on "Florisil" to give 3-acetyl-3-carbethoxy-2-carbethoxymethyl - 1,2,3,4,6,7,12, 12b-octahydro-9-methoxyindolo[2,3-a]quinolizine.

By the procedure of Example 2, isomer A and isomer B of 3-acetyl-3-carbethoxy-2-carbethoxymethyl - 1,2,3,4,6,7-hexahydro - 9 - methoxy-12H-indolo[2,3-a]quinolizinium perchlorate are prepared from the above prepared indoloquinolizine.

EXAMPLE 5

Ethyl 3-oxopentanoate (28.8 g.) is mixed with a solution of 4.6 g. sodium in 100 ml. of ethanol. The resulting mixture is treated with 44 g. of ethyl β-chloroglutarate and heated on a steam bath for one hour. The mixture is then poured into dilute hydrochloric acid. Extracting with ether, then washing, drying, concentrating and distilling the extract gives ethyl 3-carbethoxymethyl-4-carbethoxy-5-oxoheptanoate.

Using the above prepared heptanoate in place of methyl 4-carbomethoxy-3-carbomethoxymethyl 5 - oxohexanoate in the procedure of Example 1 gives, as the product, 3-carbethoxy-2-carbethoxymethyl - 1,2,3,4,6,7 - hexahydro-9 - methoxy-3-propionyl-12H-indolo[2,3-a]quinolizinium perchlorate.

Similarly, using ethyl 3-oxohexanoate and ethyl 3-oxoheptanoate in place of ethyl 3-oxopentanoate in the above procedure, the products are 3-butyryl-3-carbethoxy-2-carbethoxymethyl - 1,2,3,4,6,7-hexahydro-9-methoxy-12H-indolo[2,3-a]quinolizinium perchlorate and 3-carbethoxy-2 - carbethoxymethyl-1,2,3,4,6,7-hexahydro-9-methoxy-3-valeryl-12H-indolo[2,3-a]quinolizinium perchlorate, respectively.

EXAMPLE 6

To 20 g. of 5,6-methylenedioxyindole dissolved in 400 ml. of anhydrous ether is added, gradually at 0° C., 20 ml. of oxalyl chloride. After 30 minutes at 0° C., the solid material is filtered off and washed with ether to give 5,6-methylenedioxyindole-3-glyoxylic acid chloride which is added portionwise to a stirred solution of 500 ml. of concentrated aqueous ammonia. After the addition is complete, stirring is continued for 30 minutes at 40–50° C. The mixture is cooled and filtered to give 5,6-methylenedioxyindole-3-glyoxylamide.

Two grams of 5,6-methylenedioxyindole-3-glyoxylamide is extracted with refluxing tetrahydrofuran into a solution of 2 g. of lithium aluminum hydride in 100 ml. of tetrahydrofuran. The reaction mixture is refluxed under nitrogen for 20 hours. Wet tetrahydrofuran and then water are added. The mixture is filtered and the solid material is washed with methylene chloride. The filtrate is extracted with four portions of 10% acetic acid. The acetic acid extracts are refluxed under nitrogen and filtered. The filtrate is neutralized with aqueous sodium hydroxide and then extracted with methylene chloride. The methylene chloride extracts are washed with saturated sodium chloride, dried over sodium sulfate and the solvent is removed in vacuo to give 3-(β-aminoethyl)-5,6-methylenedioxyindole.

By the procedure of Example 1, using 3-(β-aminoethyl)-5,6-methylenedioxyindole in place of 3-(β-aminoethyl)-5-methoxyindole, the product is 3-acetyl-3-carbomethoxy-2-carbomethoxymethyl-1,2,3,4,6,7 - hexahydro-9,10 - methylenedioxy-12H-indolo[2,3-a]quinolizinium perchlorate.

By the same procedure using 5,6-dimethylindole in place of 5,6-methylenedioxyindole, the product is 3-acetyl-3-carbomethoxy-2-carbomethoxymethyl - 1,2,3,4,6,7 - hexahydro - 9,10 - dimethyl-12H-indolo[2,3-a]quinolizinium perchlorate.

EXAMPLE 7

Using 5,6-dibutoxyindole (prepared from 3,4-dibutoxybenzaldehyde by condensation with nitromethane in presence of a base, nitration with nitric acid and reduction in acid medium) in the procedure of Example 6 gives 3-acetyl - 9,10 - dibutoxy-3-carbomethoxy-2-carbomethoxymethyl - 1,2,3,4,6,7 - hexahydro-12H-indolo[2,3-a]quinolizinium perchlorate.

EXAMPLE 8

Using 3-(2-aminoethyl)-5-butylindole (prepared by treating p-butylaniline with hydrochloric acid, then sodium nitrite, reducing the resulting diazonium chloride with stannous chloride and reacting the resulting p-butylphenylhydrazine with the diethyl acetal of 4-aminobutyraldehyde in presence of a strong acid catalyst under conditions of the Fischer indole synthesis) in place of 3-(2-aminoethyl)-5-methoxyindole in the procedure of Example 1, the product is 3-acetyl-9-butyl-3-carbomethoxy-2-carbomethoxymethyl - 1,2,3,4,6,7-hexahydro-12H-indolo[2,3-a] quinolizinium perchlorate.

Similarly, using 2,4-ethylaniline the product is 3-acetyl-9,11 - diethyl-3-carbomethoxy - 2 - carbomethoxymethyl-1,2,3,4,6,7-hexahydro - 12H - indolo[2,3-a]quinolizinium perchlorate.

What is claimed is:
1. A compound of the formula:

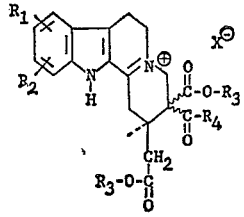

in which:
  $R_1$ is lower alkyl, lower alkoxy and $R_2$ is hydrogen or
    $R_1$ and $R_2$, taken together, are di-lower alkyl, di-lower alkoxy or methylenedioxy;
  $R_3$ is methyl or ethyl;
  $R_4$ is lower alkyl; and
  X is a pharmaceutically acceptable anion.

2. A compound according to claim 1 in which $R_1$ is methoxy, $R_2$ is hydrogen, $R_3$ and $R_4$ are methyl and X is perchlorate.

3. A compound according to claim 1 in which $R_1$ is methoxy in the 9-position, $R_2$ is hydrogen, $R_3$ and $R_4$ are methyl and X is perchlorate.

4. A compound according to claim 1 in which $R_1$ is methoxy in the 9-position, $R_2$ is hydrogen, $R_3$ and $R_4$ are methyl and X is chloride.

5. A compound according to claim 1 in which $R_1$ and $R_2$ are methoxy, $R_3$ and $R_4$ are methyl and X is perchlorate.

6. A compound according to claim 1 in which $R_1$ and $R_2$ are methoxy in positions 9 and 10, respectively, $R_3$ and $R_4$ are methyl and X is perchlorate.

7. A compound of the formula:

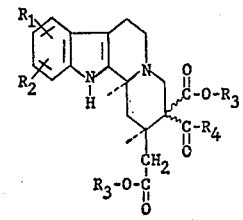

in which:
  $R_1$ is lower alkyl, lower alkoxy and $R_2$ is hydrogen or
    $R_1$ and $R_2$, taken together, are di-lower alkyl, di-lower alkoxy or methylenedioxy;
  $R_3$ is methyl or ethyl; and
  $R_4$ is lower alkyl.

8. A compound according to claim 7 in which $R_1$ is methoxy, $R_2$ is hydrogen and $R_3$ and $R_4$ are methyl.

9. A compound according to claim 7 in which $R_1$ is methoxy in the 9-position, $R_2$ is hydrogen and $R_3$ and $R_4$ are methyl.

References Cited
UNITED STATES PATENTS
3,131,192  4/1964  Mueller _____ 260—287

OTHER REFERENCES
Van Tamelen and Placeway: J. Am. Chem. Soc., vol. 83, pp. 2594–5 (1961).

HENRY R. JILES, Primary Examiner

G. THOMAS DODD, Assistant Examiner

U.S. Cl. X.R.

260—295.5, 999